United States Patent [19]

Detloff

[11] Patent Number: 5,015,030
[45] Date of Patent: May 14, 1991

[54] DRIVE LINKAGE FOR AUTOMOBILE SUNROOF

[75] Inventor: Clement A. Detloff, Southfield, Mich.

[73] Assignee: General Motors Corporation, Detroit, Mich.

[21] Appl. No.: 334,638

[22] Filed: Apr. 7, 1989

[51] Int. Cl.⁵ .................. B60J 7/05; B60J 7/057
[52] U.S. Cl. ............................ 296/223; 296/221; 49/351; 49/362
[58] Field of Search ......................... 296/221–223; 49/351, 362, 363

[56] References Cited

U.S. PATENT DOCUMENTS

| | | | |
|---|---|---|---|
| 2,408,132 | 9/1946 | Weeks | 296/223 |
| 2,774,624 | 12/1956 | Lower | 296/223 |
| 2,836,457 | 5/1958 | Beerman et al. | |
| 3,031,226 | 4/1962 | Larche | 296/222 |
| 3,806,186 | 4/1974 | Mauron | 296/223 |
| 4,403,805 | 9/1983 | Strem, Jr. et al. | 296/221 |

FOREIGN PATENT DOCUMENTS

| | | | |
|---|---|---|---|
| 2345995 | 4/1975 | Fed. Rep. of Germany | 296/223 |
| 1204099 | 9/1970 | United Kingdom | 296/222 |

Primary Examiner—Dennis H. Pedder
Attorney, Agent, or Firm—Charles E. Leahy

[57] ABSTRACT

A drive mechanism for moving a sunroof panel fore and aft along a pair of laterally spaced apart tracks mounting the sunroof panel includes a drive linkage including a pair of first and second links which are provided adjacent to each track. Each of the pair of links has outboard ends which are connected to the rear end of the sunroof panel and to the roof rearward of the sunroof opening, and inboard ends which are pivoted together to define an apex. A rotatable threaded drive shaft extends longitudinally of the body equidistant between the tracks. A drive bar extends transversely of the roof and has its ends slidably engaging with the apexes of first and second links and has a central portion threadedly engaging with the drive shaft so that drive shaft rotation drives the drive bar fore and aft and the drive bar in turn drives the apexes fore and aft. The apexes travel in an arcuate path during the fore and aft movement and are preferably supported by an arcuately shaped guide tracks which attached to the roof and slidably engaging with the apexes of the drive linkages to define and support the arcuate movement of the apexes during fore and aft movement of the sunroof panel and the drive bar.

4 Claims, 3 Drawing Sheets

DRIVE LINKAGE FOR AUTOMOBILE SUNROOF

The invention relates to a vehicle body sunroof and more particularly provides a improved drive linkage for driving the sunroof fore and aft between the open and closed positions.

BACKGROUND OF THE INVENTION

It is well known to provide a vehicle body roof panel having a roof opening which is selectively opened and closed by a sunroof panel. Such sunroof panels are conventionally operated by a track assembly which moves the closure panel fore and aft between a closed position and an opened position.

U.S. Pat. 4,403,805 is an example of the prior art sunroof mechanisms in which the sunroof panel is mounted for fore and aft movements by tracks which are mounted on the vehicle body on each side of the sunroof opening to guide and support the sunroof panel during the fore and aft movement. The sunroof is moved fore and aft by a push/pull cable.

As an alternative to the use of a push/pull cable to move the sunroof fore and aft, the prior art has also suggested the use of a rotary shaft having one end driven by a motor and fixed on the roof and the other end connected to the sunroof by a nut so that rotation of the shaft by the motor would drive the sunroof panel fore and aft.

The present invention provides a new and improved linkage for connecting a rotary drive shaft to a sunroof panel.

SUMMARY OF THE INVENTION

According to this invention a drive mechanism for moving a sunroof panel fore and aft along a pair of laterally spaced apart tracks mounting the sunroof panel includes a drive linkage including a pair of first and second links which are provided adjacent to each track. Each of the pair of links has outboard ends which are connected to the rear end of the sunroof panel and to the roof rearward of the sunroof opening, and inboard ends which are pivoted together to define an apex. A rotatable threaded drive shaft extends longitudinally of the body equidistant between the tracks. A drive bar extends transversely of the roof and has its ends slidably engaging with the apexes of first and second links and has a central portion threadedly engaging with the drive shaft so that drive shaft rotation drives the drive bar fore and aft and the drive bar in turn drives the apexes fore and aft. The apexes travel in an arcuate path during the fore and aft movement and are preferably supported by arcuately shaped guide tracks which are attached to the roof and slidably engaging with the apexes of the drive linkages to define and support the arcuate movement of the apexes during fore and aft movement of the sunroof panel and the drive bar.

BRIEF DESCRIPTION OF THE DRAWINGS

These and other objects, features and advantages of the invention will become apparent upon consideration of the specification and the appended drawings in which.

DESCRIPTION OF THE PREFERRED EMBODIMENT

Figure 1:
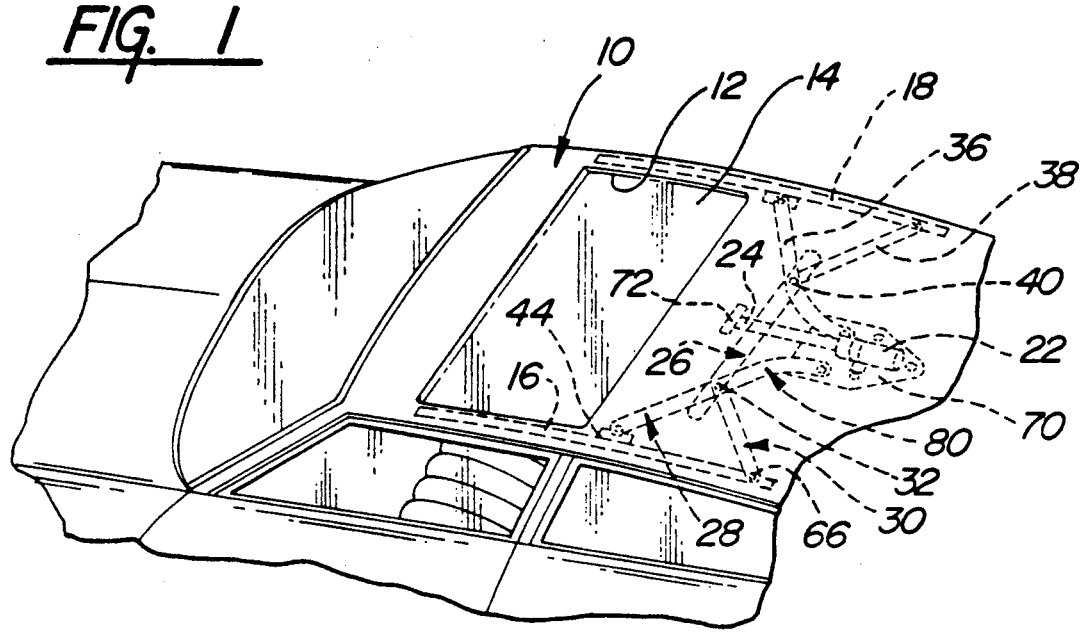
FIG. 1 is a perspective of a vehicle body roof having a sunroof drive mechanism according to the present invention.

Referring to FIG. 1 a vehicle body roof structure indicated generally at 10 includes a roof opening 12 selectively opened and closed by a sliding sunroof panel 14 which is shown as glass panel but may be a solid plastic or metallic metal.

The sunroof panel 14 moves fore and aft along tracks 16 and 18 which are mounted on the roof structrue 10 at each side of the roof opening 12. As shown in FIG. 1 the tracks 16 and 18 extend substantially rearward of the roof opening 12 in order to guide the panel 14 rearwardly to a stored position underneath the fixed portion of the roof 10.

A drive mechanism for moving the sunroof panel 14 fore and aft includes a motor 22 which rotates a threaded shaft 24. The threaded shaft is engaged by a drive bar 26 which extends transversely of the vehicle and is threadedly coupled to the drive shaft 24 as will be fully discussed hereinafter. A drive linkage is provided adjacent each of the tracks 16 and 18. The drive linkage adjacent track 16 includes a first link 28 and having an outboard end pivoted to the sunroof panel 14 and a second link 30 having an outboard end pivoted to the roof structure. The inboard ends of the first link and second link 30 are pivoted together at apex 32. The apex 32 is operatively connected to the drive bar 26 by a pin and slot connection which will be discussed herinafter. The linkage adjacent track 18 includes a first link 36 having an outboard end connected to the sunroof panel 14 and a second link 38 having an outboard end attached to the roof structure 10. Inboard ends of links 36 and 38 are connected at apex 40. The apex 40 is operatively connected to the drive bar 26 by a pin and slot connection as will be discussed further hereinafter.

Rotation of the drive shaft 24 by motor 22 drives the drive bar 26 fore and aft which in turn carries the apexes 32 and 40 fore and aft to extend and retract the drive linkages and thereby move the sunroof panel 14 fore and aft.

Figure 2:
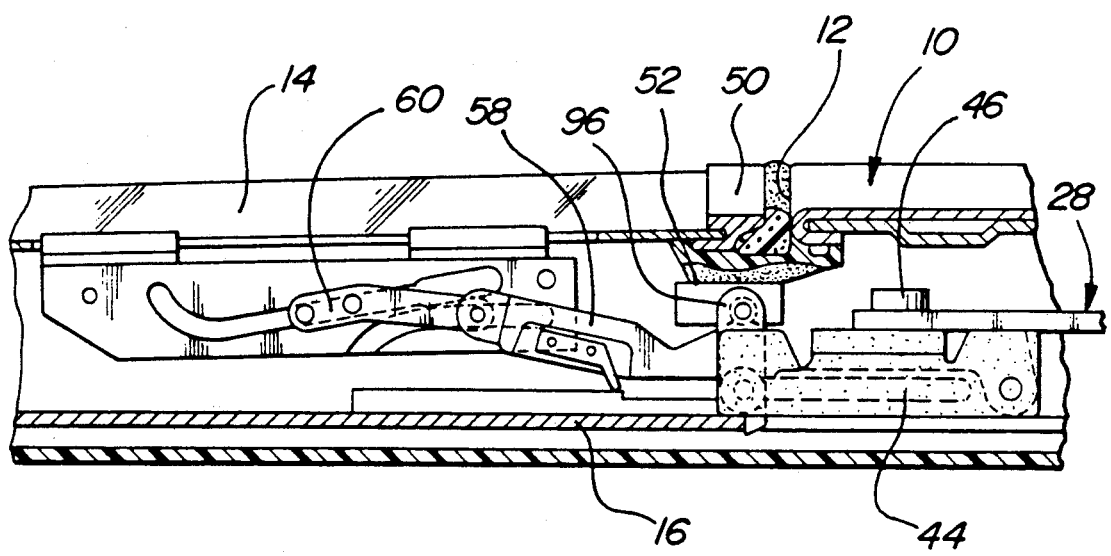
FIG. 2 is a fragmentary section view taken through the drive mechanism and showing the sunroof in the fully closed position.

Referring to FIG. 2, it is seen that the guide track 16 carries a guide block 44 which is driven fore and aft along the guide track 16 by the outboard end of the guide link 28 which is connected thereto by a pivot pin 46. The sunroof panel 14 is surrounded by a frame 50 which seats upon a carrier 52 coupled to the guide block 44 by a lifter link 96.

If the drive link 28 is retracted rearwardly from the position of FIG. 2, the rear guide block 44 is retracted rearwardly collapsing the lifter link 96 which drops the carrier 52 and sunroof panel 14 below the surface of the roof structure 10 for rearward movement to an open position. If the guide link 28 is moved further forward beyond the position of FIG. 2, the lifter link 96 remains stationary and an operator link 58 and a vent link 60 cooperate to raise the sunroof panel 14 to a ventilator position not shown. Reference may be had to U.S. Pat. 4,403,805 issued Sep. 13, 1983, for a more complete description of the construction and operation of the sunroof mechanism.

Figure 3:
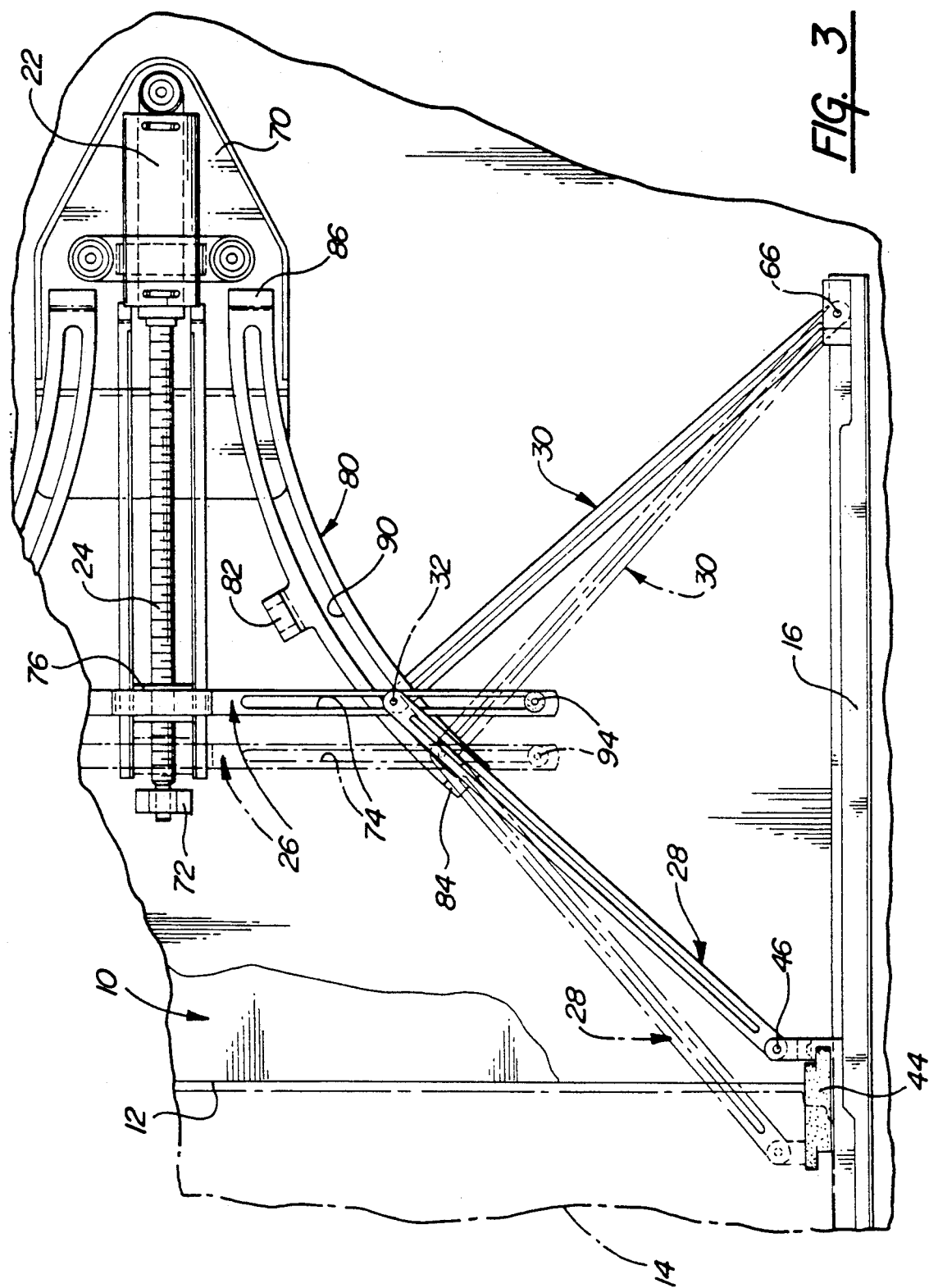
FIG. 3 is a plan view of the sunroof drive mechanism shown from overhead and showing the closed position of the sunroof in solid line indicated position and a further forward movement of the drive mechanism to the phantom line indicated position in which the sunroof panel is raised to a ventilating position.
Figure 4:
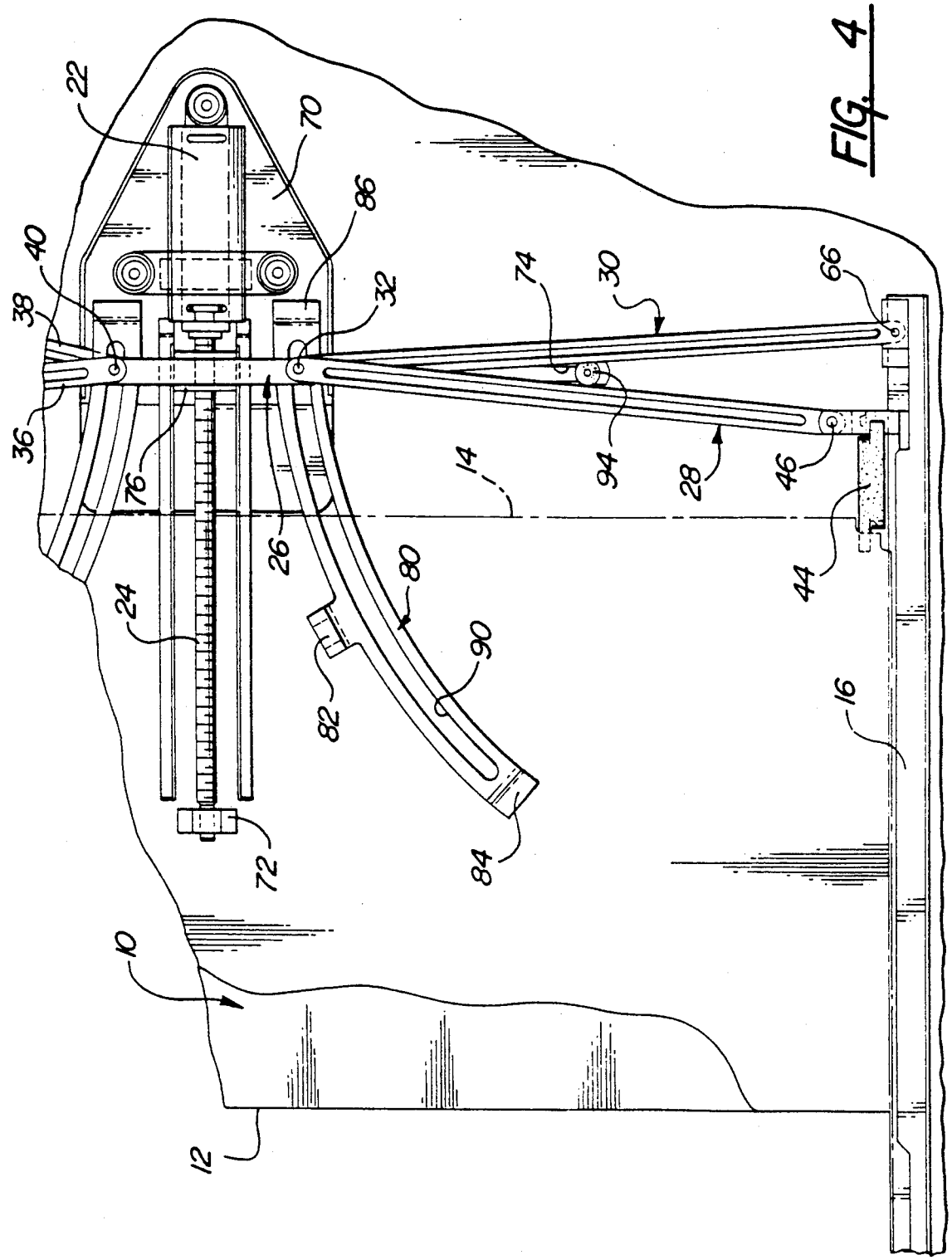
FIG. 4 is a view similar to FIG. 3 but showing the sunroof fully moved rearwardly to an opened position.

FIGS. 3 and 4 show the drive mechanism in plan view. As shown in FIG. 3, the rear guide block 44 of the sunroof panel 14 is slidably engaged in the track 16. The drive link 28 has its outboard end connected to the guide block 44 by the pivot 46. The outboard end of drive link 30 is attached to the rearward end of the guide track 16 by a pivot 66. Inboard ends of the drive links 28 and 30 are connected at apex 32.

Further, as seen in FIG. 3, the motor 22 is mounted on the vehicle roof 10 by a mounting bracket 70. The threaded shaft 24 has its rearward end carried by the motor 22 and its forward end mounted in a bearing block 72 which is mounted on the roof structure 10. The drive bar 26 extends transversely of the vehicle body between the tracks 16 and 18 has a slot 74 which receives the apex 32 of the guide links 28 and 30. The central portion of the drive bar 26 carries a nut portion 76 which encircles the threaded shaft 24 so that rotation of the shaft 24 by the motor 22 drives the drive bar 24 fore and aft. As best seen by comparing FIGS. 3 and 4, the apex 32 moves fore and aft along an arcuate path between the sunroof closed position of FIG. 3 and the sunroof opened position of FIG. 4. A support member 80 comprised of a sheet metal stamping has legs 82, 84 and 86 which attach to the vehicle roof structure 10 and defines a curvilinear slot 90 which captures the apex 32 to support and guide the movement of the apex 32. The apex 32 preferably carriers a roller or the like which is closely captured within the slot 90 of the support member 80.

OPERATION OF THE DRIVE MECHANISM

FIG. 3 shows the drive mechanism establishing the sunroof panel 14 at the closed positioned of the sunroof panel 14 corresponding to FIGS. 1 and 2.

In order to open the sunroof, that is move the sunroof panel 14 rearwardly, the motor 22 is energized to rotate the threaded shaft 24 in the direction to pull the drive bar 26 rearwardly from the position of FIG. 3 to the position of FIG. 4. The rearward movement of the drive bar 26 causes its slot 74 engaging the apex 32 to forcibly pivot the drive link 30 rearwardly in an arc about the pivot 66. The apex 32 is guided and supported within the slot 90 of the support member 80 during this rearward movement. Rearward movement of the apex 32 pulls drive link 28 rearwardly to in turn pull the sunroof guide shoe 44 rearwardly along the sunroof track 16. The drive links 36 and 38 at the other side of the threaded shaft 24 are likewise retracted.

FIG. 4 shows the drive mechanism having fully retracted the sunroof panel 14 to an open position. A rubber bumper 94 is mounted on the end of the drive bar 26 and engages with the drive links 28 and 30 to stop the rearward motion.

The sunroof is returned to the closed position by rotating the threaded shaft 24 in the opposite direction to move the drive bar 26 forwardly, thereby driving the apex 32 forwardly along the arcuate slot 90 so that the drive link 28 pushes the rear guide shoe 44 forwardly.

FIG. 3 also shows the further rotation of the drive shaft 24 by the motor 22 moving the drive bar 26 to the phantom line indicated fullest forward position in which the rear guide shoe 44 will have actuated the operator link 58 and vent link 60 to raise the sunroof to the ventilator position as more fully described in U.S. Pat. 4,403,805.

Thus it is seen that the invention provides a new and improved sunroof mechanism in which the sunroof is driven fore and aft by a drive mechanism comprised of drive links, drive bar and threaded shaft.

The embodiments of the invention in which an exclusive property or privilege is claimed are defined as follows:

1. A drive mechanism for moving a sunroof panel fore and aft along a pair of laterally spaced tracks mounting the sunroof panel in a vehicle body roof, comprising:
   a drive linkage including a first link and a second link each having an outboard end respectively connected to the sunroof panel and to the roof and each having an inboard end pivoted together to define an apex,
   and drive means acting between the roof and the apex of the drive linkage to drive the apex fore and aft along an arcuate path between a rearward position in which the drive linkage establishes the sunroof panel at a rearward opened position and a forward position in which the drive linkage establishes the sunroof panel at a forward closed position.

2. A drive mechanism for moving a sunroof panel fore and aft along a pair of laterally spaced tracks mounting the sunroof panel in a vehicle body roof, comprising:
   a drive linkage including a first link and a second link each having an outboard end respectively connected to the sunroof panel and to the roof and each having an inboard ends pivoted together to define an apex,
   support means acting between the roof and the apex and connected with the apex to support and guide the apex in an arcuate path of movement during fore and aft movement of the sunroof panel,
   and drive means acting between the roof and the apex of the drive linkage to drive the apex fore and aft along the arcuate path between a rearward position in which the drive linkage establishes the sunroof panel at a rearward opened position and a forward position in which the drive linkage establishes the sunroof panel at a forward closed position.

3. A drive mechanism for moving a sunroof panel fore and aft along a pair of laterally spaced tracks mounting the sunroof panel in a vehicle body roof, comprising:
   a drive linkage including a pair of first and second links provided adjacent each track, each of said links of said pairs of links having an outboard end respectively connected to the sunroof panel and to the roof and each having an inboard end pivoted together to define an apex,
   a rotatable threaded drive shaft extending longitudinally of the body between the tracks,
   a drive bar having ends each operatively engaging an apex of the pairs of first and second links and having a central portion threadedly engaging with the drive shaft so that drive shaft rotation drives the drive bar and the apexes fore and aft along an arcuate path between a rearward position in which the drive linkage establishes the sunroof panel at a rearward opened position and a forward position in which the drive linkage establishes the sunroof panel at a forward closed position.

4. The drive mechanism of claim 3 further characterized by support means acting between the roof and each apex of the the drive linkage and connected with the apex to support and guide the apex in an arcuate path of movement during fore and aft movement of the sunroof panel and the drive bar.

* * * * *